(12) United States Patent
Donner et al.

(10) Patent No.: US 6,614,462 B1
(45) Date of Patent: Sep. 2, 2003

(54) METHOD AND APPARATUS FOR PRINTING HIGH RESOLUTION IMAGES USING REFLECTIVE LCD MODULATORS

(75) Inventors: Janet Donner, West Henrietta, NY (US); Sujatha Ramanujan, Pittsford, NY (US); Nelson A. Blish, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/692,728

(22) Filed: Oct. 19, 2000

(51) Int. Cl.[7] .............................. B41J 2/47; B41J 27/00
(52) U.S. Cl. ...................... 347/239; 347/241; 347/255; 347/256
(58) Field of Search ................................. 347/239, 240, 347/241, 251, 255, 256, 248; 345/87, 89; 349/2, 5, 9; 355/67

(56) References Cited

U.S. PATENT DOCUMENTS

| | | | |
|---|---|---|---|
| 4,728,965 A | 3/1988 | Kessler et al. ............... 347/241 |
| 5,061,049 A | 10/1991 | Hornbeck ................... 359/224 |
| 5,159,352 A * | 10/1992 | Ferla et al. .................. 347/248 |
| 5,325,137 A | 6/1994 | Konno et al. ................. 353/63 |
| 5,379,135 A * | 1/1995 | Nakagaki et al. .............. 349/9 |
| 5,461,410 A | 10/1995 | Venkateswar et al. ....... 347/240 |
| 5,461,411 A | 10/1995 | Florence et al. .............. 353/94 |
| 5,504,514 A | 4/1996 | Nelson ....................... 347/130 |
| 5,517,340 A * | 5/1996 | Doany et al. ................... 349/5 |
| 5,521,748 A | 5/1996 | Sarraf ......................... 359/321 |
| 5,626,411 A | 5/1997 | Takahashi et al. .......... 347/240 |
| 5,652,661 A | 7/1997 | Gallipeau et al. ........... 358/302 |
| 5,701,185 A | 12/1997 | Reiss et al. ................. 358/471 |
| 5,715,029 A | 2/1998 | Fergason .................... 349/196 |
| 5,721,622 A | 2/1998 | Venkateswar ............... 358/298 |
| 5,727,860 A | 3/1998 | Broer et al. ................... 353/20 |
| 5,743,610 A | 4/1998 | Yajima et al. ................. 353/31 |
| 5,743,612 A | 4/1998 | Matsuda et al. ............... 353/97 |
| 5,745,156 A | 4/1998 | Federico et al. ............ 347/256 |
| 5,754,217 A | 5/1998 | Allen ......................... 347/239 |
| 5,754,278 A * | 5/1998 | Kurtz .......................... 355/67 |
| 5,754,305 A | 5/1998 | DeClerck et al. ........... 358/302 |
| 5,757,348 A * | 5/1998 | Handschy et al. ............. 345/89 |
| 5,805,274 A | 9/1998 | Saita ............................ 355/38 |
| 6,124,876 A * | 9/2000 | Sunagawa ................... 347/239 |

* cited by examiner

*Primary Examiner*—Hai Pham
(74) *Attorney, Agent, or Firm*—Nelson Adrian Blish

(57) ABSTRACT

An apparatus for printing images including an illumination optics (75) that provides uniform area light is disclosed. A polarizing beamsplitter (80) receives the uniform area light and redirects a first polarization state of the light to a first reflective LCD modulator (90) which modulates the first polarized light on a site by site basis and reflects the first modulator light through the polarizing beamsplitter (80). A parallel plate tilted at a first angle spatially displaces the first modulated light along a first line normal to the polarizing beamsplitter (80). A print lens assembly (110) images the first modulated light to a first position on a media plane to print a first image. The parallel plate is moved to a second position (250) and a new image is printed.

10 Claims, 12 Drawing Sheets

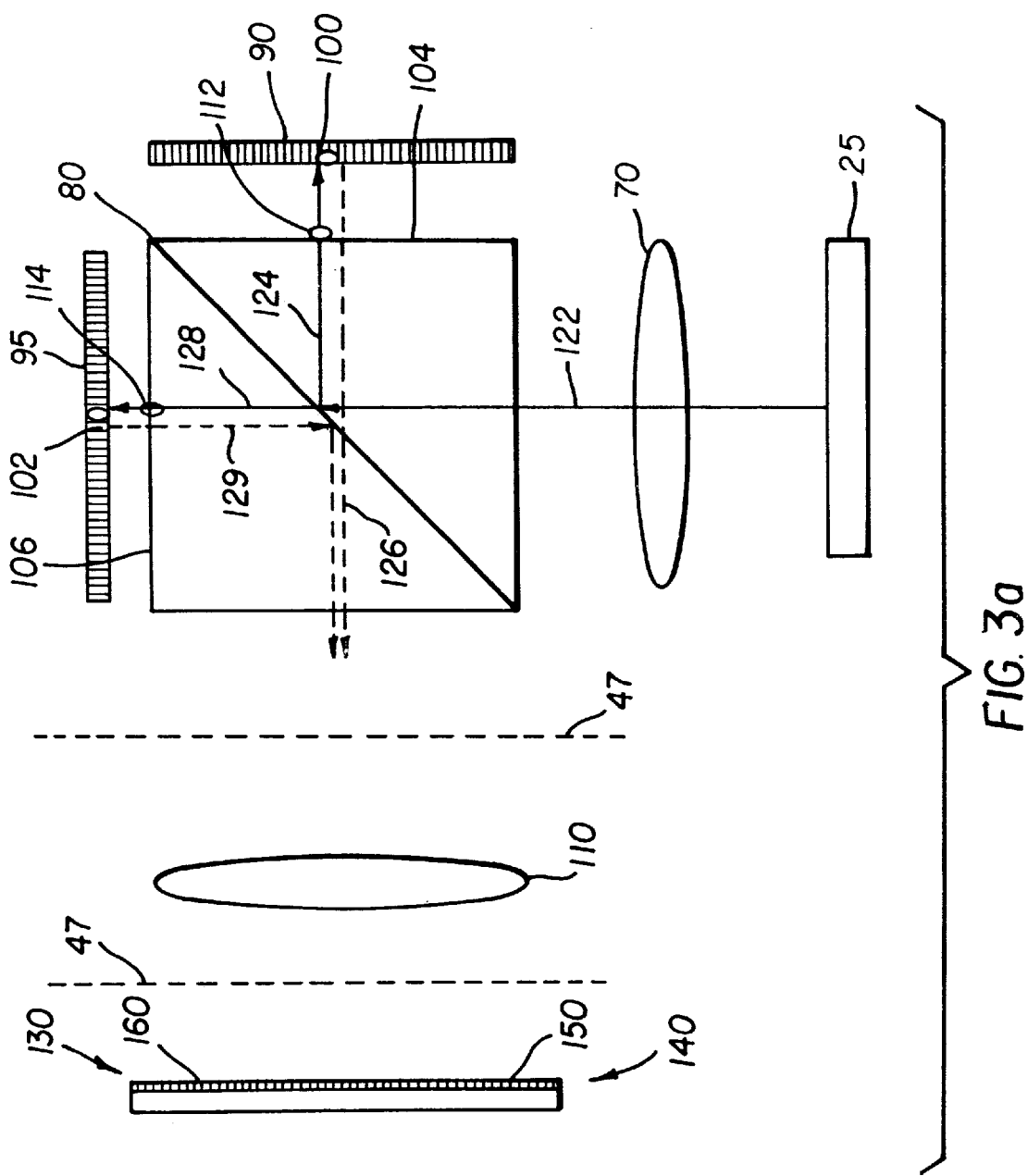

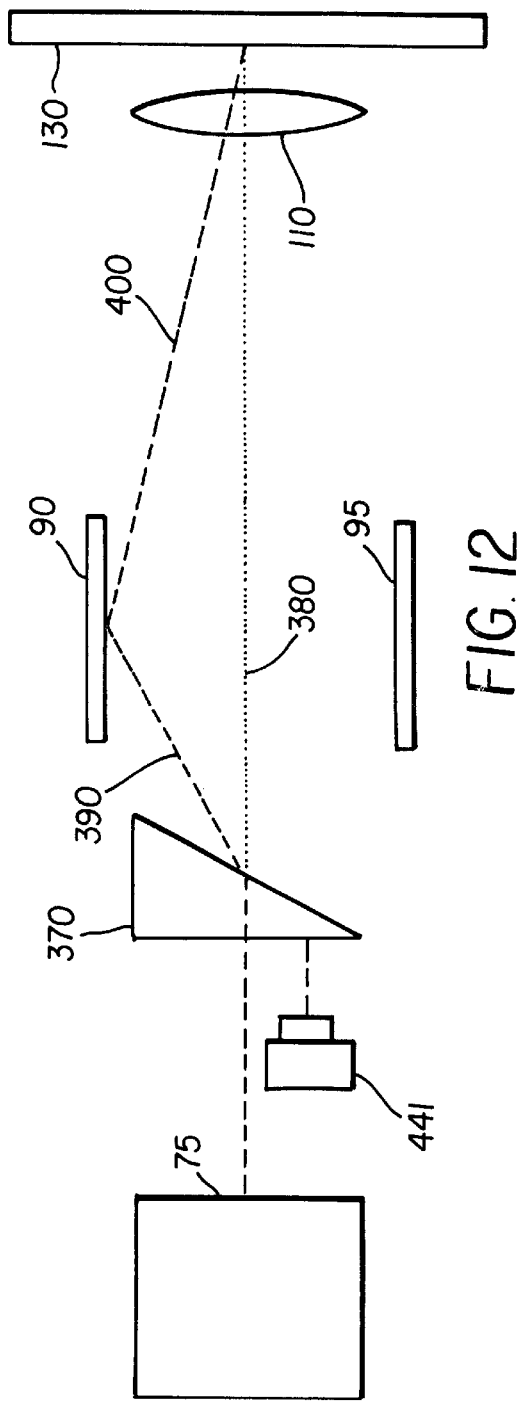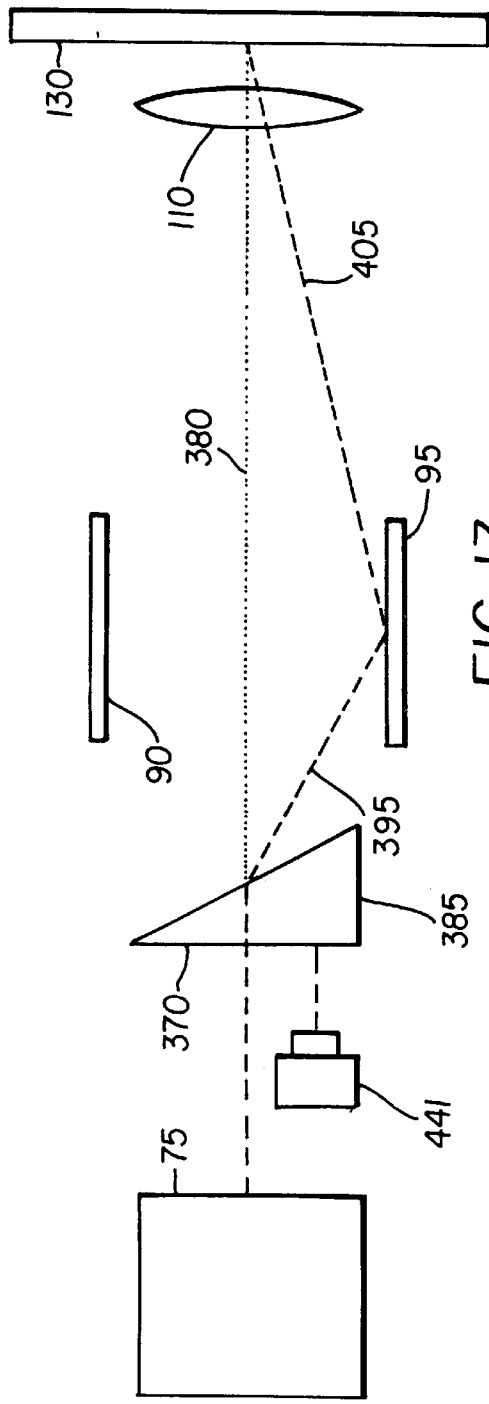

METHOD AND APPARATUS FOR PRINTING HIGH RESOLUTION IMAGES USING REFLECTIVE LCD MODULATORS

CROSS REFERENCE TO RELATED APPLICATIONS

Reference is made to commonly-assigned copending U.S. patent application Ser. No. 09/470,930, filed Dec. 22, 1999, entitled A METHOD AND APPARATUS FOR PRINTING HIGH RESOLUTION IMAGES USING REFLECTIVE LCD MODULATORS, by Ramanujan et al.; commonly-assigned copending U.S. patent application Ser. No. 09/197,328, filed Nov. 19, 1998, entitled REFLECTIVE LIQUID CRYSTAL MODULATOR BASED PRINTING SYSTEM, by Ramanujan et al.; commonly-assigned copending U.S. patent application Ser. No. 09/618,661, filed Jul. 18, 2000, entitled MULTI-CHIP LIQUID CRYSTAL PRINTER FOR LIGHT SENSITIVE MEDIA, by Ramanujan et al., the disclosures of which are incorporated herein.

FIELD OF THE INVENTION

This invention relates generally to a method for spatially and temporally modulating a light beam and more specifically to imaging a modulated light onto a light sensitive media.

BACKGROUND OF THE INVENTION

Photographic images are traditionally printed on photographic paper using conventional, film based optical printers. The photographic industry, however, is converting to digital imaging. One step in the digital printing process is to use images obtained from digital cameras, or scanned film exposed in traditional photographic cameras, to create digital image files that are then printed onto photographic paper.

The growth of the digital printing industry has led to multiple approaches to digital printing. One of the early methods used for digital printing was cathode ray tube (CRT) based printers such as the Centronics CRT recorder. This technology has several limitations related to the phosphor and the electron beam. The resolution of this technology is inadequate when printing a large format image, such as 8 inch by 10 inch photographic print. CRT printers also tend to be expensive, which is a severe shortcoming in a cost sensitive market. An additional limitation is that CRT printers do not provide sufficient red exposure to the media when operating at frame rates above 10,000 prints per hour.

Another commonly used approach to digital printing is the laser-based engine shown in U.S. Pat. No. 4,728,965. Such systems are generally polygon flying spot systems, which use red, green, and blue lasers. Unfortunately, as with CRT printers, the laser based systems tend to be expensive, since the cost of blue and green lasers remains quite high. Additionally, the currently available lasers are not compact. Another problem with laser based printing systems is that the photographic paper used for traditional photography is not suitable for a color laser printer due to reciprocity failure. High intensity reciprocity failure is a phenomenon by which photographic paper is less sensitive when exposed to high light intensity for a short period. For example, flying spot laser printers expose each of the pixels for a fraction of a microsecond, whereas optical printing systems expose the paper for the duration of the whole frame time, which can be on the order of seconds. Thus, a special paper is required for laser printers.

A more contemporary approach uses a single spatial light modulator such as a Texas Instruments digital micromirror device (DMD) as shown in U.S. Pat. No. 5,061,049. Spatial light modulators provide significant advantages in cost as well as allowing longer exposure times, and have been proposed for a variety of different printing systems from line printing systems such as the printer depicted in U.S. Pat. No. 5,521,748, to area printing systems such as the system described in U.S. Pat. No. 5,652,661.

One approach to printing using the Texas Instruments DMD, shown in U.S. Pat. No. 5,461,411, offers advantages such as longer exposure times using light emitting diodes (LED) as a source. See U.S. Pat. No. 5,504,514. However, this technology is not widely available. As a result, DMDs are expensive and not easily scaleable to higher resolution. Also, the currently available resolution is not sufficient for all printing needs.

Another low cost solution uses Liquid Crystal Display (LCD) modulators. Several photographic printers using this commonly available technology are described in U.S. Pat. Nos. 5,652,661, 5,701,185, and 5,745,156. Most of these designs involve the use of a transmissive LCD modulator such as is depicted in U.S. Pat. Nos. 5,652,661 and 5,701,185. While such methods offer several advantages in ease of optical design for printing, there are several drawbacks to the use of conventional transmissive LCD technology. Transmissive LCD modulators generally have reduced aperture ratios and the use of Transmissive Field-Effect-Transistors (TFT) on glass technology does not promote the pixel to pixel uniformity desired in many printing applications. Furthermore, in order to provide large numbers of pixels, many high resolution transmissive LCDs possess footprints of several inches. Such a large footprint can be unwieldy when combined with a print lens. As a result, most LCD printers using transmissive technology are constrained to either low resolution or small print sizes.

To print high resolution 8 inch by 10-inch images with at least 300 pixels per inch requires 2400 by 3000 pixels. Transmissive LCD modulators with such resolutions are not readily available. Furthermore, each pixel must have a gray scale depth to render a continuous tone print uniformly over the frame size, which is not available with this technology.

An alternate approach is to utilize reflective LCD modulators, which are widely accepted in the display market. Most of the activity in reflective LCD modulators has been related to projection display. The projectors are optimized to provide maximum luminous flux to the screen with secondary emphasis placed on contrast and resolution. To achieve the goals of projection display, most optical designs use high intensity lamp light sources. Additionally, many projector designs use three reflective LCD modulators, one for each of the primary colors, such as the design shown in U.S. Pat. No. 5,743,610. Using three reflective LCD modulators is both expensive and cumbersome.

For projectors using a single reflective LCD modulator, color sequential operation is required. To maintain the high luminosity in combination with the color sequential requirements, a rotating color filter wheel is sometimes employed. This is yet another large, moving part, which further complicates the system.

The recent advent of high resolution reflective LCDs with high contrast, greater than 100:1, presents possibilities for printing that were previously unavailable. See U.S. Pat. Nos. 5,325,137 and 5,805,274. Specifically, a printer may be based on a reflective LCD modulator illuminated sequentially by red, green, and blue light emitting diodes. The reflective LCD modulator may be sub-apertured and dithered in two or three directions to increase the resolution.

Dithering has been applied to transmissive LCD systems due to the less than perfect fill factor. Incorporating dithering into a reflective LCD printing system would allow high resolution printing while maintaining a small footprint. Also, because the naturally high fill factor present in many reflective LCD technologies, the dithering can be omitted with no detriment to the continuity of the printed image. While devices such as the Texas Instruments DMD can incorporate a secondary mask as shown in U.S. Pat. No. 5,754,217, the mask is displaced in some embodiments of the device, which makes manufacturing more difficult and adds to the processing complexity of the device.

Alternative forms of optical dithering are used to improve resolution in display systems incorporating LCD modulators. A calcite crystal or other electro-optic birefringent material can be used to optically shift the path of the image beam, where the amount of shift is dependent on the polarization characteristics of the image beam. This allows the shifting of one component of the image with respect to a second component of the image that has a different polarization. See U.S. Pat. No. 5,715,029 and 5,727,860. In addition to the use of birefringent material, U.S. Pat. No. 5,626,411 uses the law of refraction with isotropic optical media of different indices of refraction to displace one image component from a second image component. These methods of beam displacement are used in a dynamic imaging system and serve to increase resolution by interlacing raster lines to form two lines of sub-images. The two sub-images are imaged faster than in perceivable by the human visual system, so that the individual images are integrated into a composite image as seen by the observer.

The use of a reflective LCD serves to significantly reduce the cost of the printing system. Furthermore, the use of an area reflective LCD modulator sets the exposure times at sufficient length to avoid or significantly reduce reciprocity failure.

The progress in the reflective LCD device field made in response to needs of the projection display industry have provided opportunities in printing applications. Thus, a reflective LCD modulator designed for projection display can be incorporated into the printing design with little modification to the LCD itself. Also, by designing an exposure system and data path with an existing projection display device allows incorporation of an inexpensive commodity item into the print engine.

Of the reflective LCD technologies, the most suitable to this design is one that incorporates a small footprint with an integrated Complementary Metal Oxide Semiconductor (CMOS) backplane. The compact size along with the uniformity of drive offered by such a device will translate into better image quality than other LCD technologies. There has been progress in the projection display industry towards incorporating a single reflective LCD, primarily because of the lower cost and weight of single device systems. See U.S. Pat. No. 5,743,612. Of the LCD technologies, the reflective LCD with a silicon backplane can best achieve the high speeds required for color sequential operation. While this increased speed may not be as essential to printing as it is for projection display, the higher speeds can be utilized to incorporate additional gray scale and uniformity correction to printing systems.

While the reflective LCD modulator has enabled low cost digital printing on light sensitive media, the demands of high resolution printing have not been fully addressed. For many applications, such as imaging for medical applications, resolution is critical. Often, the resolution provided by a single reflection LCD modulator is insufficient. It then becomes necessary to create an image wherein multiple images are merged to create a single high-resolution image. Creating a merged image without artifacts along the borders, or in regions where image data may overlap, is desirable. While juxtaposing or spatially interweaving image data alone may have been attempted in previous applications, such a superposition of images with the use of reflective LCDs provides images of high quality without compromising the cost or productivity of the print engine. By utilizing polarization-based modulation, a print engine can utilize light already available in the optical system.

Juxtaposing or spatially interweaving image data has been attempted with some success in projection displays. Fergason, in U.S. Pat. No. 5,715,029, describes a method to improve resolution of a display by altering the beam path using a birefringent medium such as a calcite crystal or an electro-optic liquid crystal cell. For projection applications using a transmissive LCD, Philips Corporation deflects the beam path by using birefringent elements as shown in U.S. Pat. No. 5,727,860. Another method, using isotropic optical elements to juxtapose or spatially interweave images in a projection display using a transmissive LCD, is described in U.S. Pat. No. 5,626,411.

Modulator printing systems can incorporate a variety of methods to achieve gray scale. Texas Instruments employs a time delayed integration system that works well with line arrays as shown in U.S. Pat. Nos. 5,721,622, and 5,461,410. While this method can provide adequate gray levels at a reasonable speed, line printing Time Delayed Integration (TDI) methods can result in registration problems and soft images. Alternate methods have been proposed particularly around transmissive LCDs such as the design presented in U.S. Pat. No. 5,754,305.

It is desirable to increase the resolution of a photographic image, using available technology cost, and reduce reciprocity failure, while preserving adequate gray scale.

SUMMARY OF THE INVENTION

It is an object of the present invention to provide a method and apparatus for printing high resolution images using reflective LCD modulators. The present invention is directed at overcoming one or more of the problems set forth in the background of the invention.

Briefly summarized according to one aspect of the present invention, an apparatus for printing images comprising an illumination optics that provides uniform area light. A polarizing beamsplitter receives the uniform area light and redirects a first polarization state of the light to a first reflective LCD modulator which modulates the first polarized light on a site by site basis and reflects the first modulator light through the polarizing beamsplitter. A parallel plate tilted at a first angle spatially displaces the first modulated light along a first line normal to the polarizing beamsplitter. A print lens assembly images the first modulated light to a first position on a media plane to print a first image. The parallel plate is moved to a second position and a new image is printed In one embodiment, the media is exposed in a color sequential manner with a two-dimensional color image. The LEDs are arranged in a two-dimensional pattern and are addressed in a series of pulses of varying amplitude and duration, in a color sequential manner to provide illumination of varying light levels to the reflective LCD modulator, thus extending the gray scale available through the reflective LCD modulator.

In another embodiment, an illumination optics lens is comprised of a collimating lens, a lenslet array, and a telecentric condensor lens, which provide uniform, telecentric illumination. Light of one polarization state incident on the polarizing beamsplitter is channeled in the direction of the reflective LCD modulator located at one facet of the polarizing beamsplitter.

Uniform light incident on the reflective LCD modulator is modulated on a site by site basis. Image data is displayed on the reflective LCD modulator as a series of frames corresponding to the illumination level and color. The voltage supplied to the reflective LCD modulator varies with the illumination wavelength. Light modulated by the reflective LCD modulator is passed through the polarizing beamsplitter and a print lens. Image data to the modulator contains independent data the superposition of which creates a composite image.

The print lens assembly is used to provide a high contrast magnified image at the image plane. At the image plane, multiple images from the reflective LCD modulator are generated in a color sequential manner and imaged on a two-dimensional area on the media. Upon completion of exposure of a given image, the media is advanced and the next image is exposed.

In a further embodiment, the print lens assembly is used to provide a high contrast demagnified image at the image plane.

In another embodiment, multiple reflective LCD modulators are imaged at more than one distinct location on the media by means of a prisms or mirrors.

In an additional embodiment, multiple reflective LCD modulators are imaged at more than one distinct location on the media by means of glass plates.

In a further embodiment, multiple reflective LCD modulators are imaged at more than one distinct location on the media by repositioning the print assembly.

A primary advantage of the present invention is the ability to produce high resolution images without reciprocity failures. Furthermore, a reflective LCD modulator is sufficiently fast so that a printer according to the present invention can create gray scale images without time delayed integration. For this reason, an apparatus according to the present invention can cover image artifacts due to image superposition without substantial mechanical or electrical complexity. The bulk of artifact reduction takes place in the software algorithms already designed for image correction.

The illumination system has been described with particular reference to a preferred embodiment utilizing LEDs as the light source. It is understood that alternative light sources and modifications thereof can be effected within the scope of the invention. The invention and its objects and advantages will become more apparent in the detailed description of the preferred embodiment presented below.

BRIEF DESCRIPTION OF THE DRAWINGS

FIGS. 3a and 3b are schematic views of reflective LCD modulator based printing system utilizing a polarizing beamsplitter and two reflective LCD modulators.

FIG. 12 is a schematic view of a dual reflective LCD modulator prism imaging system with first reflective LCD modulator illuminated.

FIG. 13 is a schematic view of a dual LCD prism imaging system with second LCD illuminated.

DETAILED DESCRIPTION OF THE INVENTION

The present description will be directed in particular to elements forming part of, or in cooperation more directly with, an apparatus in accordance with the present invention. It is understood that the elements not shown specifically or described may take various forms well known to those skilled in the art.

Figure 1:
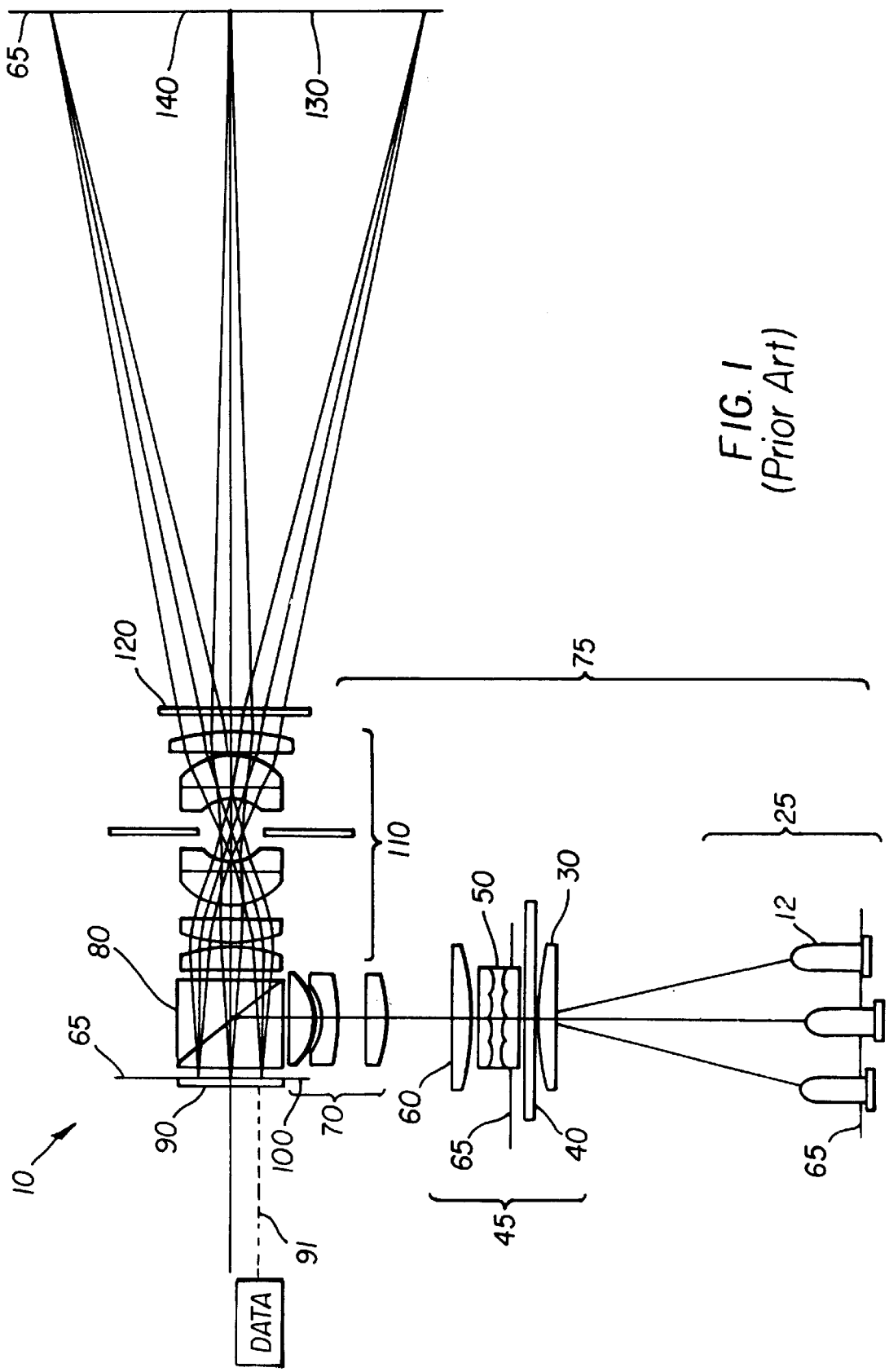
FIG. 1 is a schematic view of a prior art reflective LCD modulator system for printing two-dimensional swaths.

Referring to FIG. 1, there is illustrated a prior art printer referred to in general by numeral 10. The photographic printer is comprised of a light emitting array diode (LED) 25, uniformizing optics 45, polarizing beamsplitter 80, reflective LCD modulator 90, a data path 91 for providing image information to the reflective LCD modulator 90, and a print lens assembly 110. The photographic printing system 10 provides a two-dimensional image on light sensitive media 140 located at an image plane 130.

The LEDs 12 are arranged in a two-dimensional array 25. Each of the LEDs emit one of three distinct wavelengths, red, blue, or green. The LEDs are typically mounted in a circular aperture and are arranged such that the colors of emission are spread evenly about the aperture. The relative number of LEDs emitting at a given wavelength is determined by the sensitivity of the media onto which the light is imaged. For example, the array may consist of four red LEDs, two green LEDs, and two blue LEDs. The LEDs are spaced such that a significant fraction of the light emitted can be captured in the collection aperture of the illumination optics 75. Furthermore, redundancy in emitters reduces the system sensitivity to malfunction in any individual LED.

The LEDs 12 are operated in a pulsed and color sequential manner. For any given image, groups of LEDs are activated in order of wavelength. For example, the red LEDs are activated and deactivated, the blue LEDs are activated and deactivated, then the green LEDs are activated and deactivated. Any activation cycle for a given wavelength consists of a series of pulses, which may vary in duration or amplitude. The length and duration of the pulses is determined by the level of illumination needed per image to define the gray scale and by the sensitivity of the media 140 to light level and illumination time. It should be noted that certain light sensitive media require only monochromatic illumination. For such applications, LEDs of a single wavelength are employed and there is no color sequence.

Each of the LEDs 12 is mapped by the illumination optics 75 to cover the area of the reflective LCD modulator 90 in a uniform and essentially telecentric manner at the modulator plane 65. This design is unique to printing applications because the requirements for uniformity of illumination and uniformity of image are far more stringent in printing then in projection display. Specifically, the tolerance to roll-off at the edges of the illumination is much greater in a projection system. The telecentricity is required to maintain the uniformity of the image at the image plane 130 due to constraints on the LCD operation. The conjugate plane 65 is shown in FIG. 1 and referred throughout the remainder of the specification.

The illumination optics 75 is designed to illuminate a nearly square or rectangular aperture. In general, axially symmetric components are employed in the illumination. Following the LEDs 12 are uniformizing optics 45 comprising a field lens 30 that images light to a lenslet array 50 and field lens 60. The light at the intermediate conjugate plane 65 is broken into a number of portions equivalent to the number of elements in the first portion of lenslet array 50. The individual portions are then superimposed and magnified by the second portion of lenslet array 50 and the field lens 60. A condenser lens 70 is positioned immediately before the polarizing beamsplitter 80.

In a single reflective LCD modulator imaging system a linear polarizer 40 may be incorporated in the illumination optics 75 prior to the polarizing beamsplitter 80. Light from the LEDs 12 is randomly polarized. Light of one polarization state passes through the polarizing beamsplitter 80 while light from a second state of polarization is directed at a right angle. The distance from the lenslet array 50 to the plane of uniform illumination 65 is equidistant for each of the paths. Consequently, for a system designed to illuminate multiple devices, the optical system can be modified to incorporate two distinct polarization states by simply utilizing the multiple states of polarization produced by the source.

The reflective LCD modulator 90 and the polarized beamsplitter 80 are followed by print lens assembly 110 and a linear polarizer 120. This lens assembly provides the correct magnification of the image of the reflective LCD modulator 90 to the image plane 150 where the light sensitive media 140 is located. The print lens assembly 110 is designed to provide magnification relating to a given image size at the media plane 140. The image size at the media plane 140 may be greater than, equal to, or less than the dimension of the reflective LCD modulator 90. Once imaged at the media plane, the printer moves the media to a next position or the printer assembly or a printer subassembly is moved to another position and the next image is recorded. In any system on any media on which images are created at multiple wavelengths, the composite tri-color image will be referred to as an image.

Figure 2A:
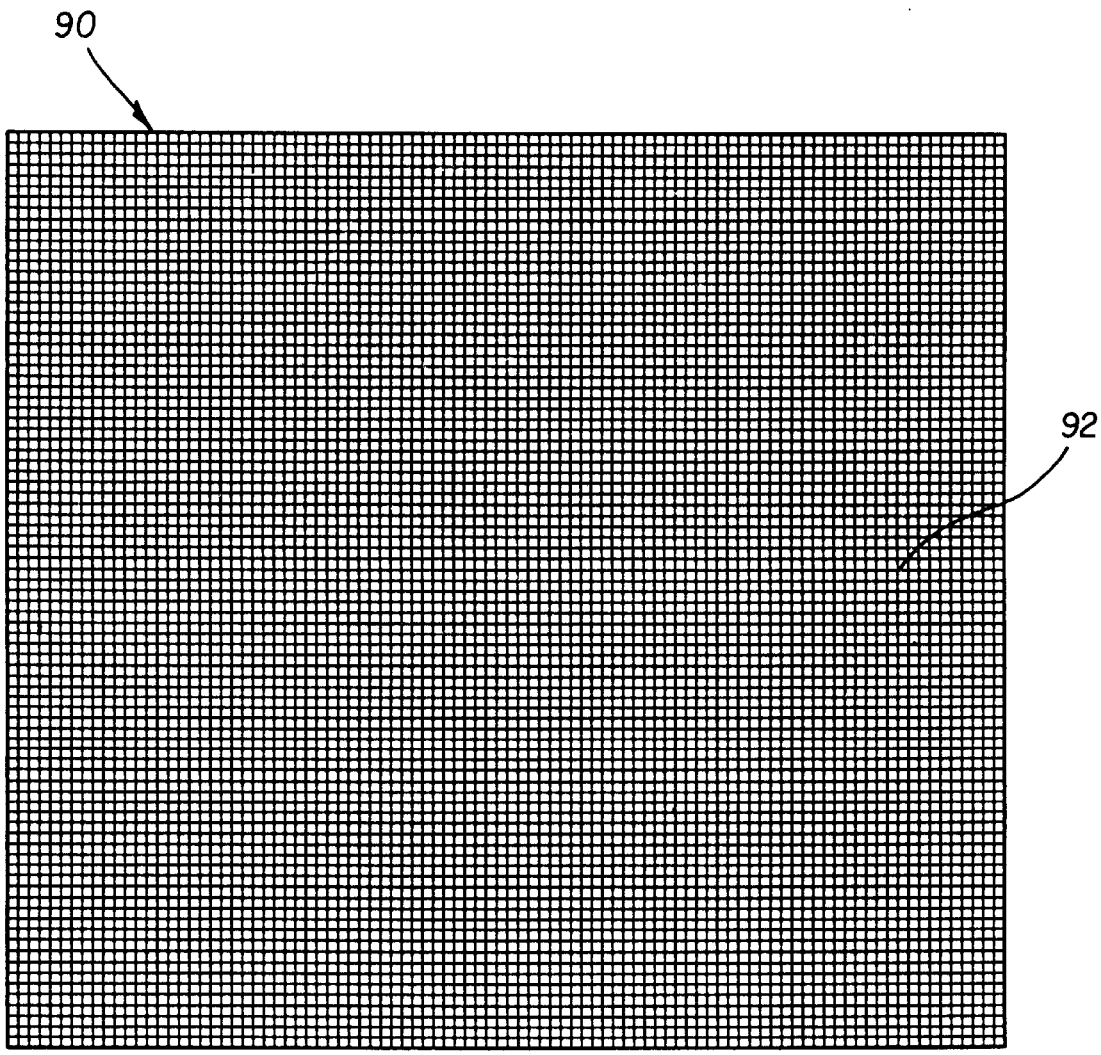
FIGS. 2a and 2b are a top plan view and a side view in cross section, respectively, of a reflective LCD modulator.
Figure 2B:
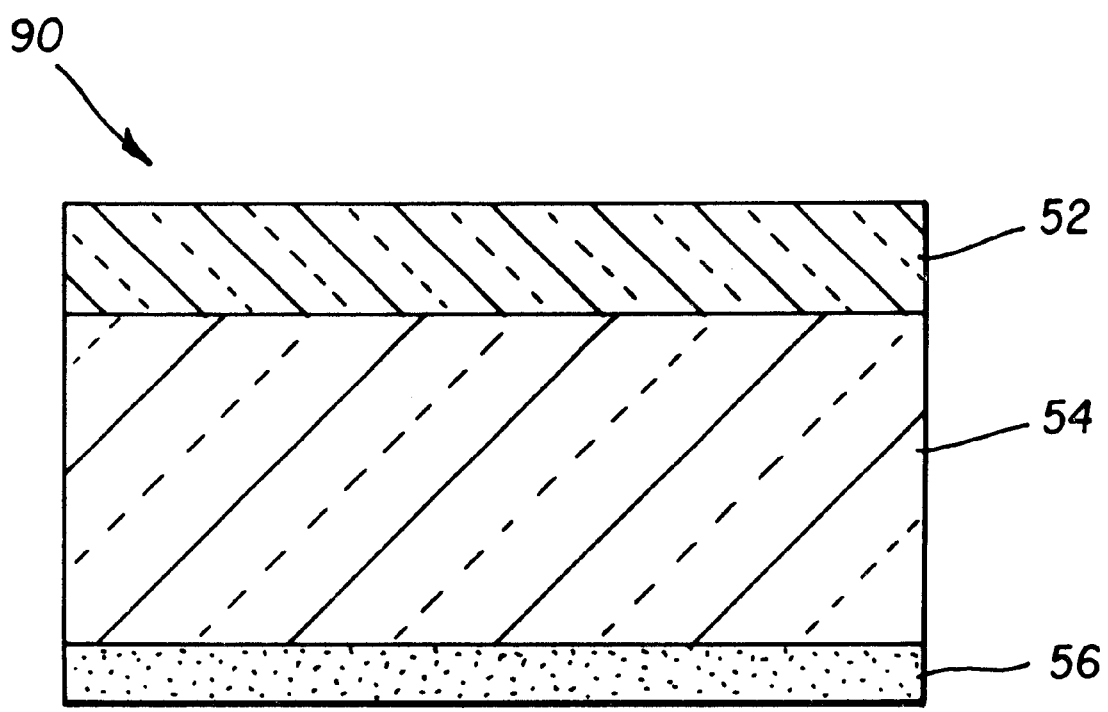

FIGS. 2a and 2b show a top view and a side view respectively of a reflective LCD modulator as used in the present invention. The reflective LCD modulator 90 consists of a plurality of modulator sites 92 that are individually modulatable. Light passes through the top surface 52, liquid crystal material 54, is reflected off the back plane 56 of the modulator, and returns through the modulator. If a modulator site 92 is "on" or bright, during the round-trip through the reflective LDC modulator 90, the polarization state of the light is rotated. In an ideal case the polarization state of the light is rotated 90 degrees. However, this degree of rotation is rarely easily achieved. If a given modulator site is "off" or dark, the polarization state of the light is not rotated. The light that is not modulated is not passed straight through the polarized beamsplitter 80 but is redirected away from the light sensitive media 140 plane by the polarized beamsplitter 80. It should be noted that the polarization state of the light that is rotated by a reflective LCD modulator 90 may become elliptically polarized, however, upon passing through a linear polarizer 120, shown in FIG. 1, the light will regain a linearly polarized state.

The most readily available choice of reflective polarization based modulators is the reflective liquid crystal modulator. Such modulators, originally developed for use in projection display, can have resolutions as high as 4000× 2000 modulator sites. Currently, resolutions of 1200×1600 are available with footprints as small as 0.9 inches diagonal. These high resolution reflective LCD modulators, are often twisted nematic LCDs, or homeotropically aligned reflective LCD modulators, although other types of reflective LCD modulators such as ferroelectric are often employed in projection display. Some of the key characteristics of these LCDs are: high resolution; the high contrast (>100:1) in all three primary colors; fast frame rate, 70 frames per second or higher; and the high aperture ratio, i.e. greater than 90%. In addition, the incorporation of a CMOS backplane increases the uniformity across the array. The LCDs are also capable of producing an eight bit gray scale either through pulse width modulation or through analog operation. In either case data may be introduced digitally to the printing system. These characteristics ensure that the reflective LCD modulator is an excellent choice for use in a reflective printing system.

The reflective LCD modulator 90 can be designed in a number of different configurations. The most amenable to a low cost printing system is a single chip system used in color sequential mode. Such an LCD may be either specifically designed for color sequential use, often incorporating a faster backplane and slightly different liquid crystal compositions, or can be a single chip with a 60 to 70 frame per second backplane. The latter option is sufficient for printing because the high frame rates are not a necessity and often reduce the bit depth of the resulting image. However, while many liquid crystals have the same basic properties for all three primary color wavelengths, sometimes, either due to the specific applied voltage or the liquid crystal thickness, operation may differ in the three wavelengths. Specifically, for a given liquid crystal composition, depth, and applied voltage, the resulting polarization rotation on an incident beam may vary with wavelength. The efficiency and contrast of the modulation will vary among the three colors. This optical system is designed to image and pass light with a rotated polarization state. However, the degree of rotation will vary as a function of wavelength. In the bright, or "on" state, this difference in rotation will affect the efficiency of the system. In other words, the percentage of incident light that is actually modulated and imaged on the media plane will vary. This difference in wavelength efficiency can be accounted for by varying the illumination strength, and exposure time. Also, the media requires different power densities in the different wavelengths. More significant problems arise in the dark or "off state". In this state, the polarization state of the light is not rotated and should not be directed thought the polarizing beamsplitter 80 and imaged. If the polarization state of the light is in fact rotated, light will leak through the imaging system and decrease the contrast.

The light directed onto the reflective LCD modulator 90 is essentially telecentric. This aspect of the invention sets it apart from systems generally used for projection display. If the light impinging is not telecentric, then modulation across the different angles of incident light is not uniform which will lead to a severe degradation in contrast.

In systems that utilize more than one reflective LCD modulator, see FIG. 3, each of the reflective LCD modulators is distinct, and the activation voltage may differ between the two modulators. Ideally, the behavior of multiple reflective LCD modulators is identical, but processing differences may necessitate tuning the modulators independently. Additionally, because polarization rotation is not perfect at the modulator, care must be taken in the addressing scheme to allow adequate modulation at each device.

FIG. 3*a* depicts an optical system based on multiple two dimensional reflective polarization based reflective LCD modulators. Of the incident light 122, light of the s-polarization state 124 passing through the polarizing beamsplitter 80 is redirected to the plane of the reflective LCD modulator 90. The p-polarization state 128 is passed through the polarizing beamsplitter 80. Light impinging on the reflective LCD modulator 90 is modulated and reflected back 126 through the polarizing beamsplitter 80. P-polarized 126 modulated light from the reflective LCD 90 is passed through the polarizing beamsplitter 80 to the print lens assembly 110 assembly and subsequently imaged at the image plane 130 onto the light sensitive media 140.

In a similar fashion the p-polarization state 128 impinges on modulator 95 is modulated and reflected back 129 through the polarizing beamsplitter 80. The s-polarized 129 modulated light from the reflective LCD 90 is passed through the polarizing beamsplitter 80 to the print lens assembly 110 and subsequently imaged at image plane 130 onto the light sensitive media 140.

It should be noted that in the embodiments featuring a polarizing beamsplitter 80 and the use of a reflective LCD modulator, discussion has centered on the use of one or two reflective LCD modulators. This approach however, can be generalized to as many reflective LCD modulators as there are facets on the polarizing beamsplitter 80. Additionally, multiple polarizing beamsplitters and x-prisms may be employed to incorporate multiple devices.

One aspect of this invention that separates the design and implementation from projection display is the contrast required for printing. In particular, light sensitive media may require contrast as low as 30:1 for a particular color. Also, in general, the contrast requirement for red light is more severe than that required for blue light because the media on which data is projected is generally more sensitive to blue light. In projection display systems contrast of greater than 100:1 is often required. Furthermore, contrast requirements are equally stringent in all three colors. The design implications of these differences are significant. With multiple LCDs in place, the total amount of leakage light passing through the cube in the imaging system would be greater than that of a single LCD system. If leakage occurred in both polarization states, degradation in the contrast of the image would result.

Another major difference stems from the independent color requirements. Because the required contrast for red light printing is often greater than that required for the other colors, a color sequential system is an achievable goal. Specifically, a device and optical system designed primarily around red light is adequate in the blue and green. So, a single chip color sequential system does not require a special LCD and can be implemented with a device designed for color separated projection. It may be necessary to change the backplane voltage of the LCD as a function of illumination wavelength. When the system is generalized to multiple reflective LCD modulators, each reflective LCD modulator can operate color sequentially with LCDs designed for either color sequential or color recombination. In a color sequential projection system, special devices designed for color sequential operation, providing high contrast in all three colors, must be employed. Such devices are not readily available and produce insufficient brightness at the image. Consequently, color recombination systems are favored in many projection systems.

In the embodiment of the invention shown in FIG. 3*a*, the images created at the media 140 by the two reflective LCD modulators 90, 95 overlap and are registered with zero displacement. The centers 100, 102 of the reflective LCD modulators 90, 95 line up with the center of the polarizing beamsplitter facets 112, 114 respectively. Such a system does not increase resolution, but reduces the time required to print by increasing the net light level at the media thus increasing the productivity. Also, site defects may be covered up or compensated.

Figure 3B:
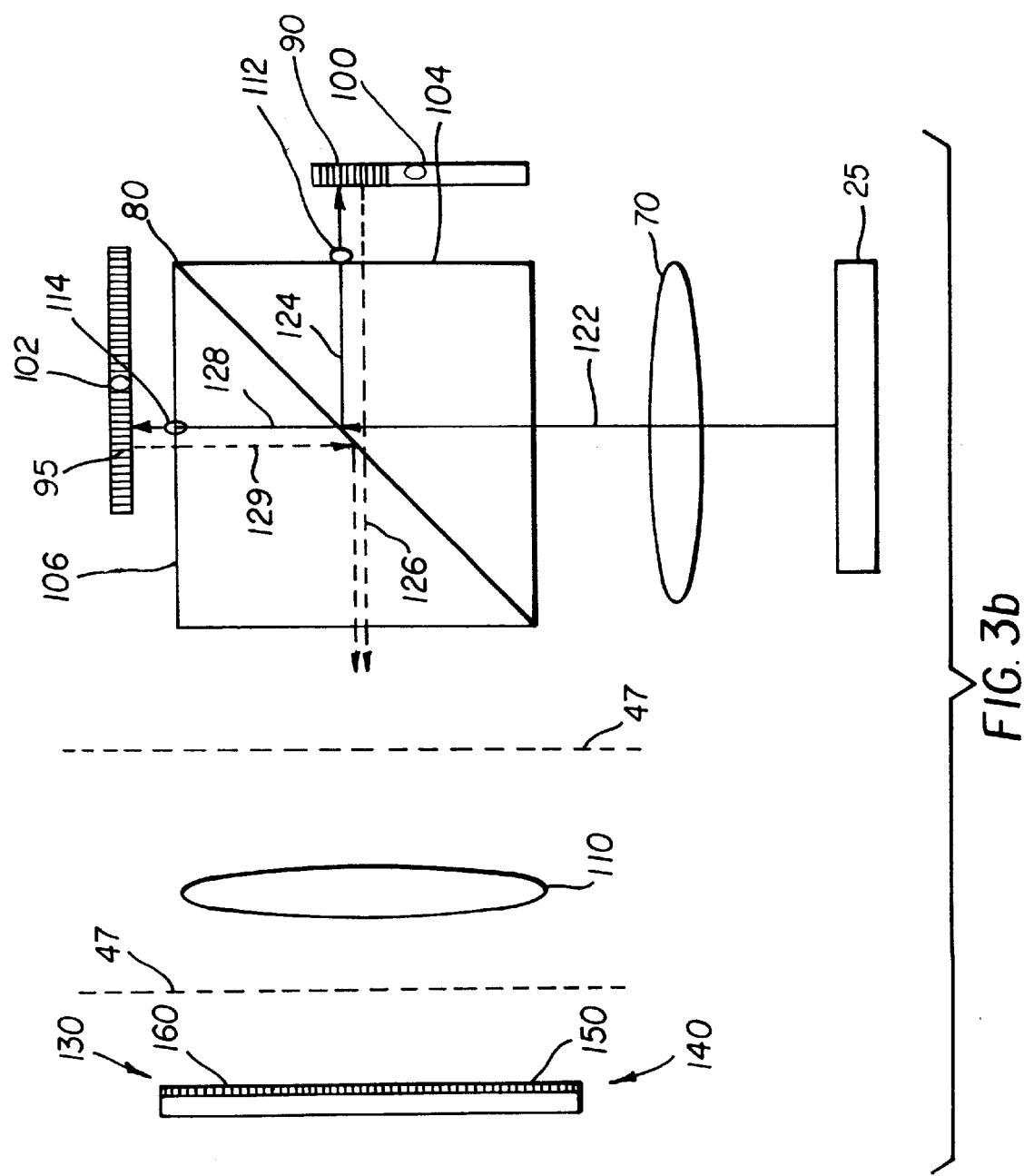

In another embodiment shown in FIG. 3*b* two LCDs are employed at two separate facets 104, 106 of the polarizing beamsplitter 80. The lateral position of each LCD in the plane parallel to the polarizing beamsplitter 80 is chosen such that the resulting image at the media 140 is an interwoven image. Specifically the centers 100, 102 of the reflective LCD modulators 90, 95 are displaced from the centers 112, 114 of the facets of the polarizing beamsplitter 80 such that the composite images of reflective LCD modulator 90 and reflective LCD modulator 95 are displaced.

Figure 5:
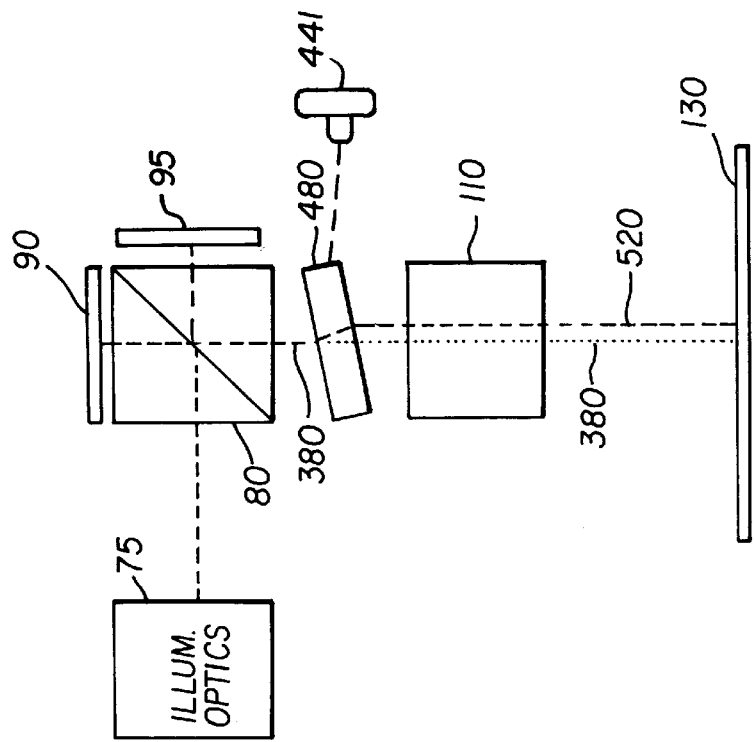
FIG. 5 is a schematic view of a dual reflective LCD modulator imaging system with a plane parallel plate in a second position.
Figure 4:
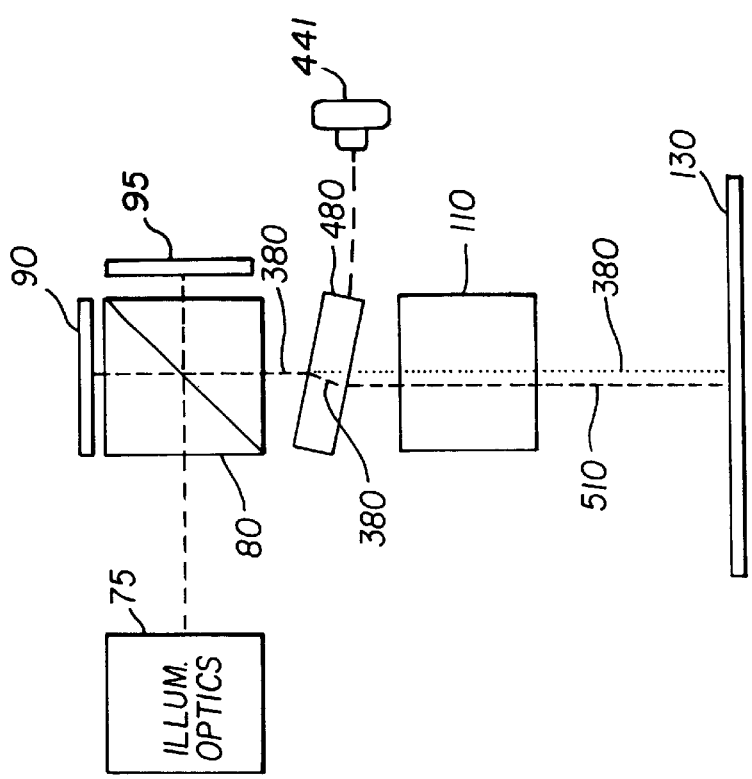
FIG. 4 is a schematic view of a dual reflective LCD modulator imaging system with a plane parallel plate in a first position.

In FIGS. 4 and 5, in a further embodiment, a single reflective LCD modulator 90 is imaged at more than one distinct location on the media by means of a transmissive plane parallel plate 480. This system consists of illumination optics 75, a polarizing beamsplitter 80, a transparent plane parallel plate 480, a print lens assembly 110 and the image plane 130 where the media 140 is located. Telecentric illumination is incident on the reflective LCD modulator 90. The polarizing beamsplitter 80 transmits the modulated light. A first position of the transparent plane parallel plate 480, shown in FIG. 4 is one such that it is inclined at an angle θ with respect to the incident beam path. The direction of the light incident on the first surface of the plane parallel plate is at an incident angle θ to that surface. The light is refracted at the first surface of the plane parallel plate 480 and travels through the plane parallel plate 480. The angle of the refracted beam is dependent on the incident angle θ, the index of refraction of the plate material and the wavelength of the light. This relationship can be expressed using Snell's Law as:

$$\sin(\theta_2) = \sin(\theta_1)/n_2,$$

where $\theta_1$ is the incident angle, $\theta_2$ is the refracted angle, $n_2$ is the index of refraction as a function of wavelength of the plane parallel plate material, and the index of refraction of the material surrounding the plate is unity. At the second surface of the plane parallel, the beam is refracted again. The direction of the light 510 that is passed through the plate 480 is parallel to the direction of the light that is incident 380 on the first surface of the plane parallel plate but is displaced with respect to a light beam that is not deflected from the incident direction. The amount of displacement is dependent on the thickness of the plate, the incident angle θ, the refractive index of the plate as well as the medium about the plate, and the wavelength of the light. Using the paraxial approximation that $\sin(\theta_1)=\theta_1$, the amount of displacement can be expressed as:

$$D = t*\theta_1 - t*\theta_1/n_2,$$

where D is the amount of displacement, t is the plate thickness, $\theta_1$ is the incident angle, $n_2$ is the index of refraction of the plate, and the index of refraction of the material surrounding the plate is unity. The displaced beam is then transmitted by the print lens assembly 110 and imaged on the media 140.

The parameters determining the amount of displacement can be altered to achieve different amounts of displacement. For example, in FIG. 5 a second position of the transparent plane parallel plate 480 is shown. This different position changes the incident angle θ of the light at the first plate surface and results in a different amount of displacement of the emerging beam 520. Changes in the angle θ can be done in two dimensions by rotating the plane parallel plate with motor 441 about either of the axes forming orthogonal planes to the direction of the incident beam propagation.

In this embodiment, a composite image can be formed by first exposing the media to the image data with the plane parallel plate in one position or orientation. Leaving the media position unchanged, a second exposure is made after displacing the beam path from the position of the first exposure. This change in the displacement of the beam path can be a distance such that the image data from the two exposures are interwoven and the composite image at the media plane is comprised of two images displaced by an integer number of half pixels.

In the LCD printing systems that have been described in the previous embodiments, a polarizing beamsplitter 80 has been used as part of the imaging system. The use of a polarizing beamsplitter 80 is one method of imaging a single or multiple LCDs. Interwoven or juxtaposed images may also be produced in non-polarization based imaging systems. The following embodiments describe alternative methods of imaging a single or multiple LCDs to produce composite images.

Figure 6A:
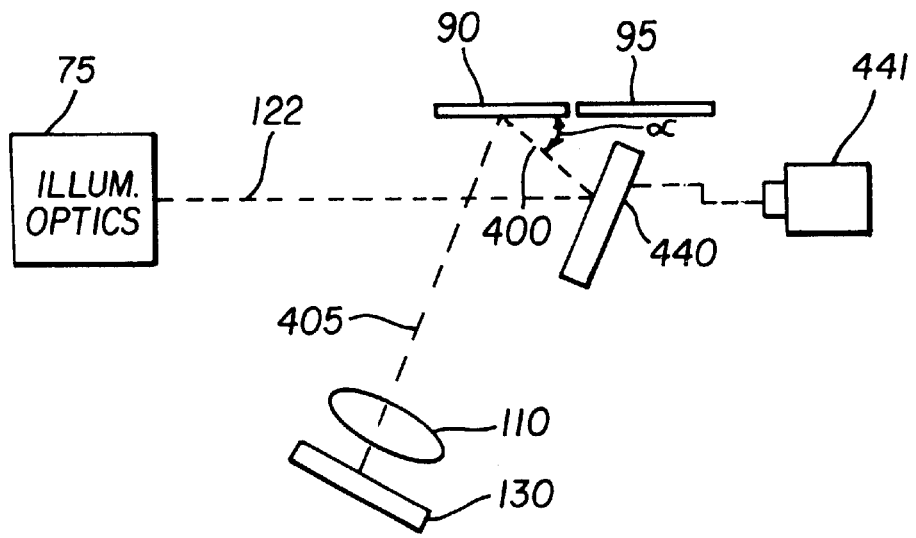
FIGS. 6a and 6b are schematic views of a dual reflective LCD modulator imaging system with a reflective element in a first and second position.
Figure 6B:
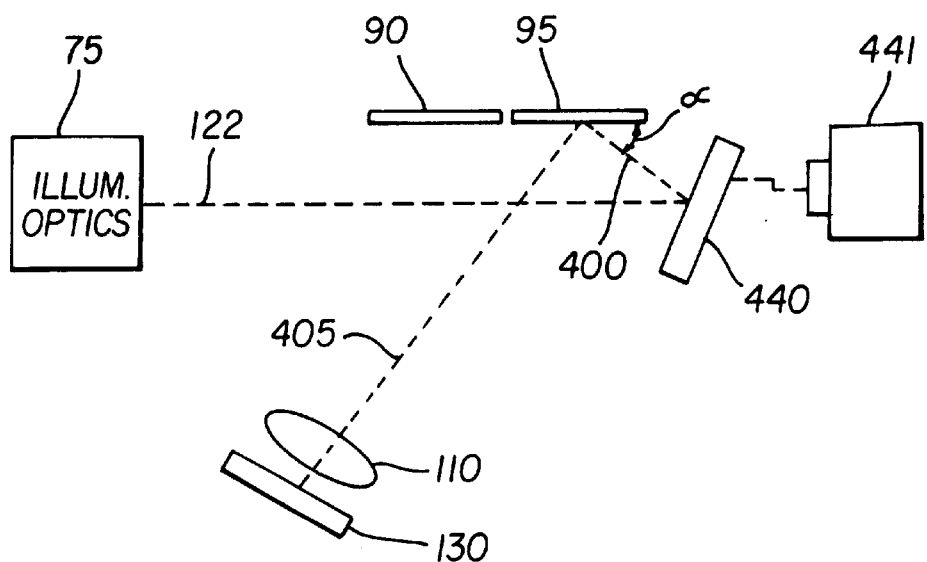

In the embodiment, shown in FIGS. 6a and 6b, multiple reflective LCD modulators are imaged at more than one distinct location on the media by means of a mirrors. Referring to FIG. 6a, an optical system is comprised of illumination optics 75, reflective LCD modulators 90, 95 placed adjacent to one another, and a reflective element 440. The media is located at plane 130. In this embodiment, the reflective element 440 is positioned such that the incident illumination 122 is reflected 400 at an angle to the plane of the first reflective LCD modulator 90. The illumination directed at the reflective LCD modulator 90 is not telecentric in this embodiment. Off axis illumination produces a phase modulation that is different than the modulation produced by illumination directed normal to the plane of the reflective LCD modulator. Because the effective path length of light in the electro-optic liquid crystal is a function of the incident angle, the phase change is also a function of the angle of the illumination incident to the LCD. Changing the voltage to the LCD as a function of illumination angle is one method that can be used to keep the phase modulation of the illumination constant. The modulated light 405 is imaged at the one distinct location on the media.

After the media is imaged, the reflective element 440 is then translated to a second position, as illustrated in FIG. 6b. A motor 441 or other mechanical means is used to move reflective element or mirror to the second position. In this position, the reflective element 440 reflects the incident illumination at angle to the plane of the second reflective LCD modulator 95. For a translation that includes a specific amount of lateral displacement without rotation of the reflective element 440, the angle of the incident illumination to the plane of the reflective LCD modulator 95 is equivalent to the angle of the illumination incident to the first reflective LCD modulator 90. The reflected beam 405 from the reflective LCD modulator 95 will be collinear with the reflected beam from reflective LCD modulator 90. The reflective LCD modulator 95 will be imaged at the image plane in a location laterally displaced from the image of reflective LCD modulator 90 to form a composite image on the media. The reflective element can be translated in a similar manner to multiple positions if multiple reflective LCD modulators are to be imaged. The amount of lateral displacement of the reflective device 440 can be changed to image the first or second reflective LCD modulator 90, 95 at various discrete locations on the media in order to form a composite image.

Figure 7A:
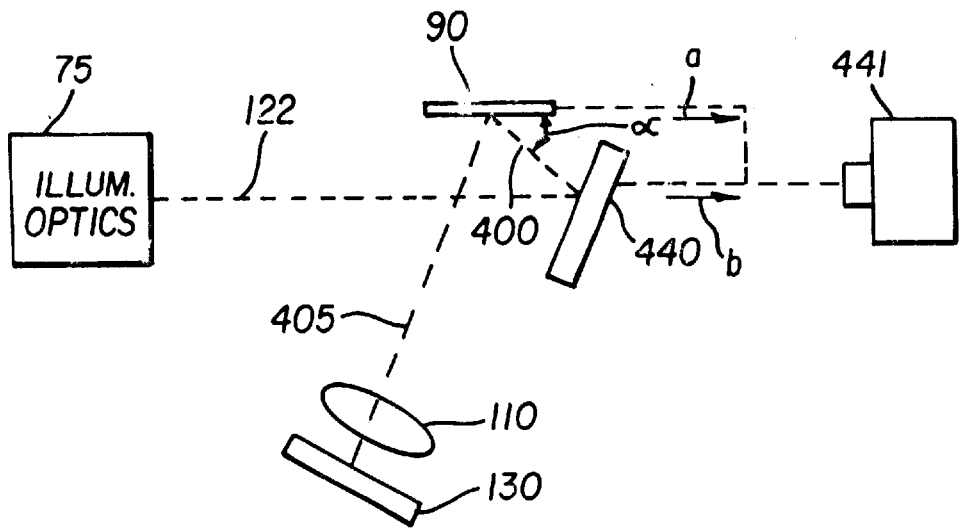
FIGS. 7a and 7b are alternate embodiments of the invention shown in FIGS. 6a and 6b.
Figure 7B:
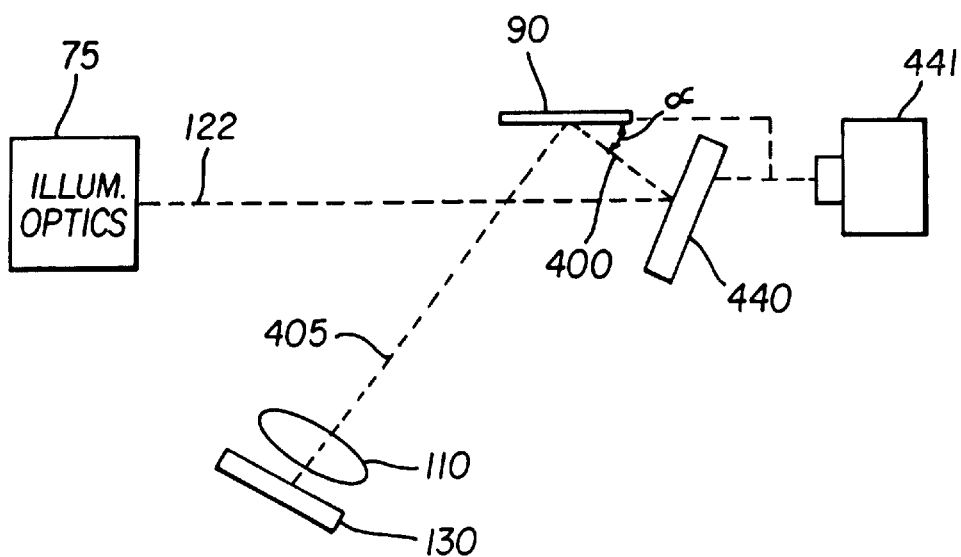

In the embodiments shown in FIGS. 7a and 7b a single reflective LCD modulator 90 is moved in tandem with mirror 440. Both are moved in a direction parallel to a normal to illumination optics 75.

Figure 8:
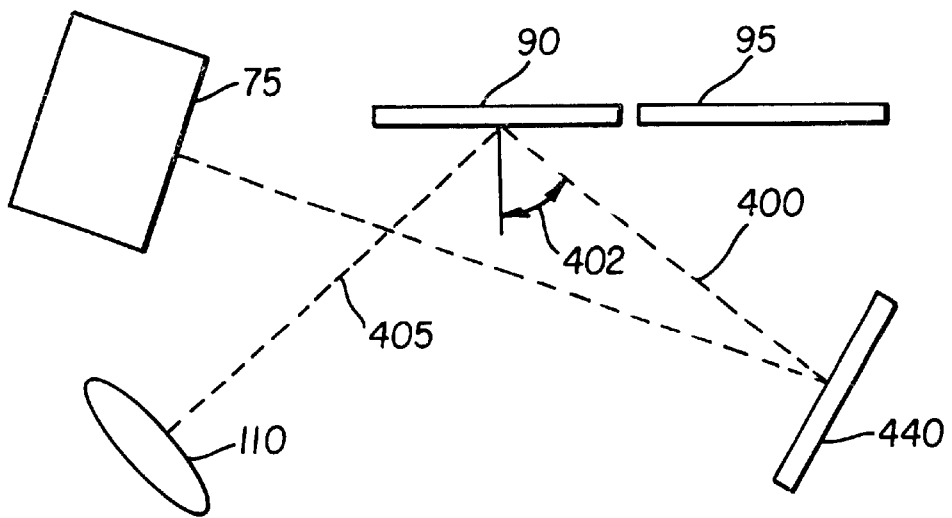
FIG. 8 is a schematic views of a dual reflective LCD modulator imaging system with a reflective element in a rotated first position.

In a further embodiment, multiple reflective LCD modulators are imaged at more than one distinct location on the media by means of a rotating prism or mirror. Referring to FIG. 8, an optical system is comprised of the illumination optics 75, reflective LCD modulators 90, 95 placed adjacent to one another, a reflective element 440. In this embodiment, and the reflective element 440 is positioned so that it reflects the incident illumination at a given angle to the plane of the first reflective LCD modulator 90. The illumination directed at the reflective LCD modulator need not be telecentric. As in the previously mentioned embodiment, changing the voltage to the reflective LCD modulator is one method that may be used to keep the modulation constant. The modulated light is imaged at the one distinct location on the media.

Figure 9:
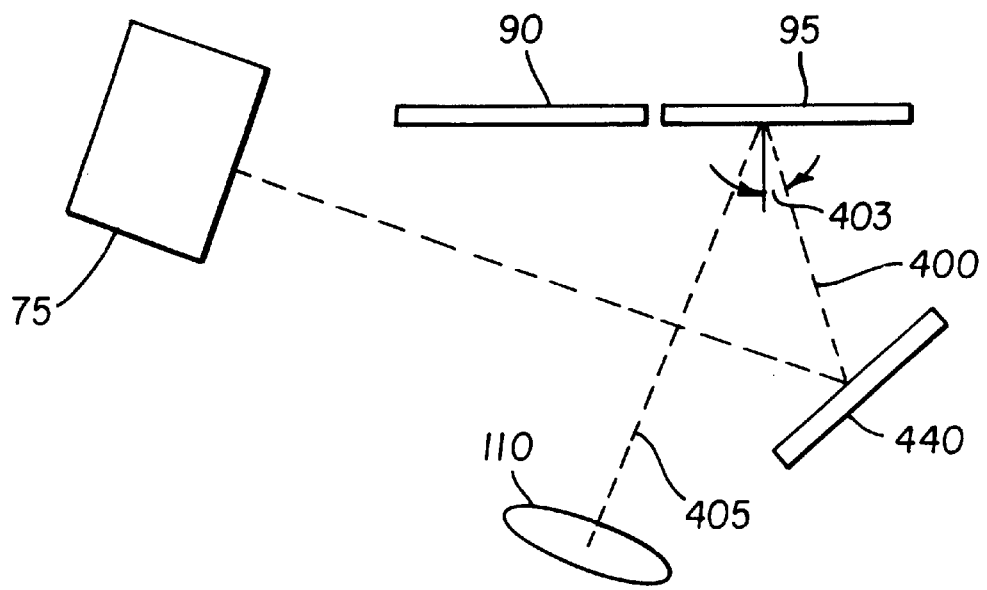
FIG. 9 is a schematic view of a dual reflective LCD modulator imaging system with a reflective element in a rotated second position.

The reflective element 440, for example, a mirror or prism, is then rotated to a second position, as illustrated in FIG. 9. In this position, it reflects the incident illumination at a second angle to the plane of the second reflective LCD modulator 95. With this rotation of the reflective element, the angle 403 of the reflected incident light 400 at the plane of the reflective LCD modulator 95 will not be equivalent to the angle 402 of the illumination incident to the first reflective LCD modulator 90. A resulting phase change between the first position image and the second position image may occur. Because the effective path length of light in the electro-optic liquid crystal is a function of the incident angle, the modulation changes as a function of the angle of the illumination incident to the reflective LCD modulator. Data displayed at the reflective LCD modulator must reflect the functional difference. Discrepancies in image uniformity can be handled in a manner similar to non-uniformities at the reflective LCD modulator. Changing the voltage to the reflective LCD modulators as a function of illumination angle is one method that can be used to keep the modulation constant. The reflective LCD modulators may also be mounted on a device that serves to rotate them in such a way that the angular position of the reflective LCD modulators with respect to the incident illumination remains constant. Further adding to the system complexity, the reflected beam path 405 emanating from the reflective LCD modulator 95 will not be collinear with the reflected beam path from reflective LCD modulator 90. One method that may be used to avoid degradation of the image at the media is to rotate the plane of the media. The reflective element can be rotated to multiple positions of multiple reflective LCD modulators are to be imaged. The reflective element can be rotated such that the image position of the second modulator at the media is displaced with respect to the image position of the first modulator. Images from multiple modulators can be displaced with respect to each other in a similar manner. These images may be interwoven or juxtaposed, depending on the amount of displacement, and form a composite image at the media plane.

The displacement of the image can be a distance such that the image data at the two image positions are slightly overlapped and image data is corrected at the reflective LCD modulator to account for the regions of overlap. This correction may be in the form of a different mapping of code values of the image data in the overlap region. It is necessary because the grayscales in the region of overlap must be balanced with the grayscales in the region where there is no overlap. The displacement of the images can be a distance such that the image data from the two image positions are interwoven such that the composite image at the media plane is comprised of two images preferably displaced by an odd integer number of half pixels. The displacement of the image can also be a distance such that image data from the first image position is juxtaposed with respect to the second image position.

Figure 10:
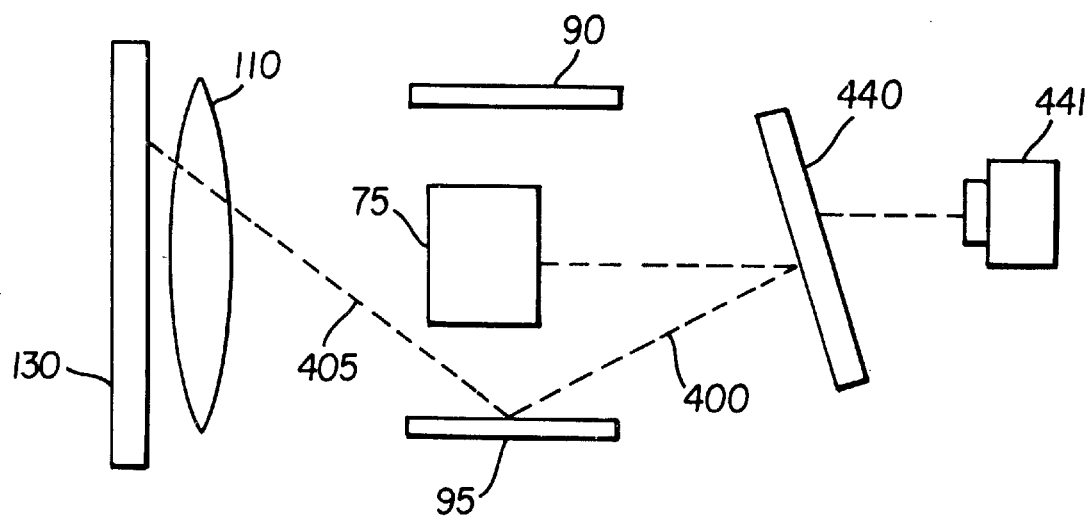
FIG. 10 is a schematic view of a dual reflective LCD modulator imaging system with a first LCD illuminated.

In a further embodiment, multiple reflective LCD modulators are imaged at more than one distinct location on the media by means of a rotating prism or mirror. Referring to FIG. 10, there is illustrated an optical system which comprises of the illumination optics 75, reflective LCD modulators 90 and 95, a reflective element 440 and an image plane 130. In this embodiment, the planes of the reflective LCD modulators are not coincident. The reflective element 440 is positioned so that it reflects the incident illumination at a given angle to the plane of the first reflective LCD modulator 90. The illumination directed at the LCD is not telecentric. As in the previous embodiment, one method to compensate for the resultant phase change is to change the voltage to the LCD as a function of illumination angle to keep the modulation constant. The modulated light is image at the one distinct location on the media.

Figure 11:
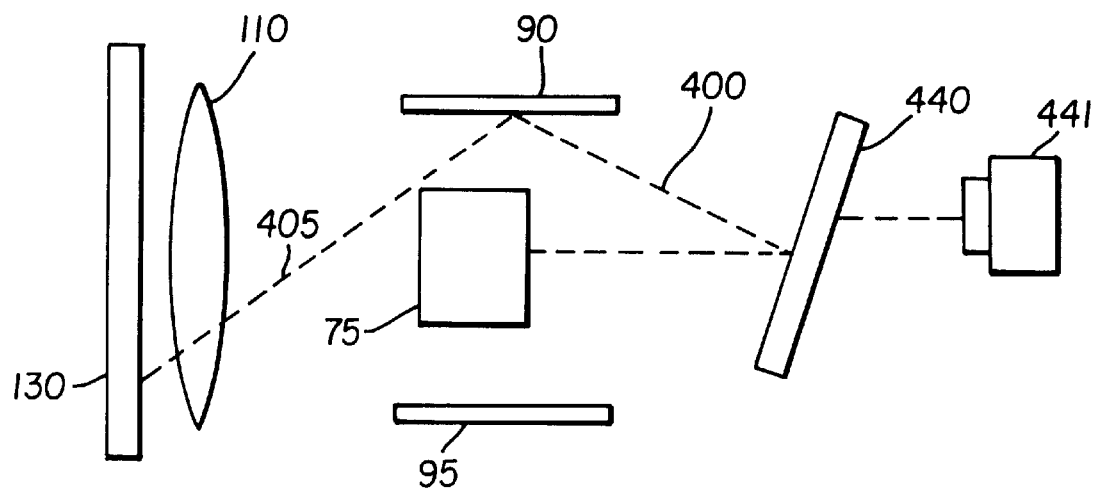
FIG. 11 is a schematic view of a dual reflective LCD modulator imaging system with a second LCD illuminated.

The reflective element 440 is then rotated to a second position, as illustrated in FIG. 11. In this position, it reflects the incident illumination at a second angle to the plane of the second reflective LCD modulator 95. The angle that the incident illumination makes with the second reflective LCD modulator 95 can be equivalent to or different than the angle of incident illumination to reflective LCD modulator 90. If these angles are not equivalent, the resulting discrepancies in the phase change between the image of the first reflective LCD modulator 90 and the image of the second reflective LCD modulator 95 must then be accounted for, adding complexity to the system. To ensure similar imaging condition at the media, the plane of the media may rotated. The reflective element can be rotated in a similar manner to multiple positions if multiple reflective LCD modulators are to be imaged. The reflective element can be rotated such that the image position of the second modulator at the media is displaced with respect to the image position of the first modulator. Images from multiple modulators can be displaced with respect to each other in a similar manner. These images may be interwoven or juxtaposed depending on the amount of displacement to form a composite image at the media plane.

In a further embodiment, multiple reflective LCD modulators are imaged at more than one distinct location on the media by means of a transmissive prism. Referring to FIG. 12, there is illustrated an optical system comprised of illumination optics 75, reflective LCD modulators 90, 95, a transmissive prism 370 and an image plane 130. In this embodiment, the planes of the reflective LCD modulators are not coincident. The first position of the transmissive prism 370, shown in FIG. 12, is such that it refracts the incident illumination along refracted light beam path 390 at a given angle to the plane of the first reflective LCD modulator 90. The angle of refracted beam is dependent on the geometry of the prism, the wavelength of the light, and the index of refraction of the prism material as well as the index of refraction of the medium about the prism. The illumination directed at the LCD is not telecentric. As in the previous embodiment, the resultant phase change can be accounted for by changing the voltage to the LCD as a function of illumination angle to keep the modulation constant. The modulated light is imaged at the one distinct location on the media 130.

Figure 14:
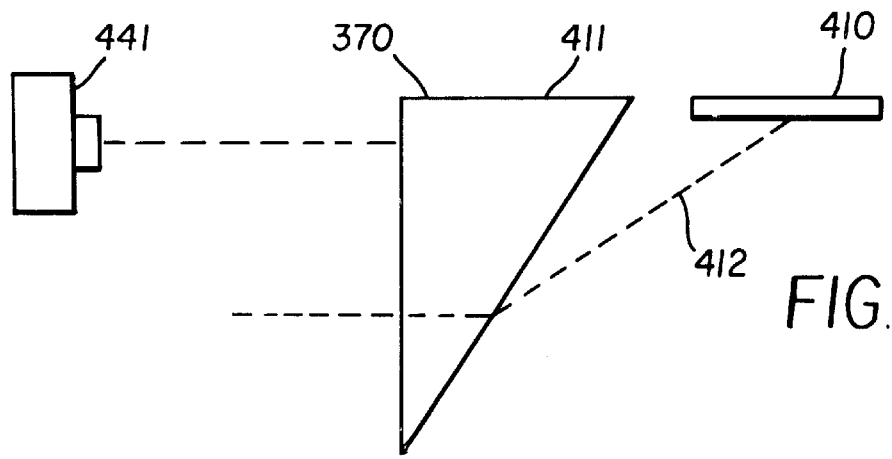
FIG. 14 is a schematic view of a prism positioned for a first wavelength.
Figure 15:
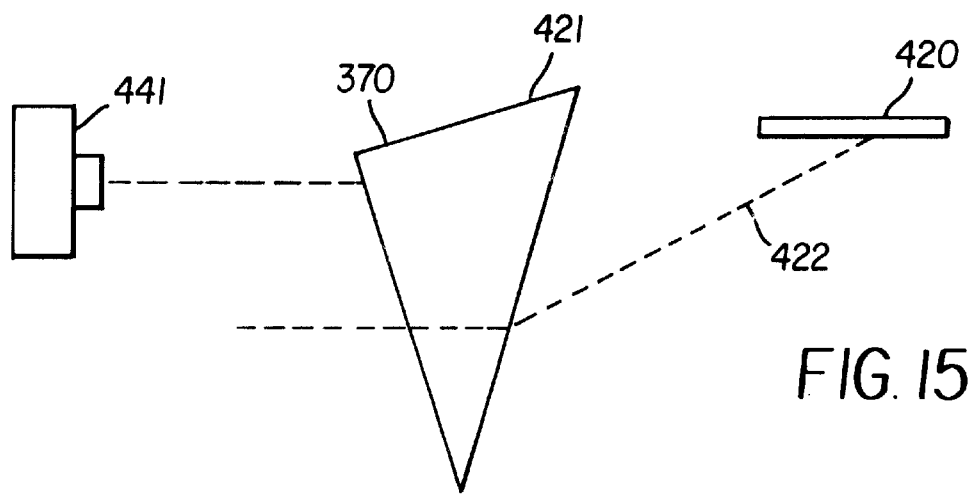
FIG. 15 is a schematic view of a prism positioned for a second wavelength.
Figure 16:
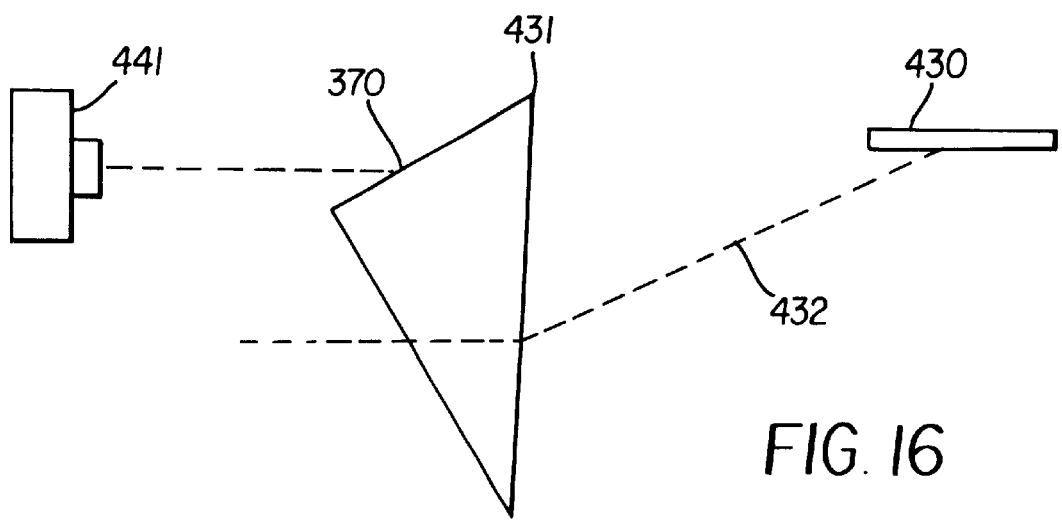
FIG. 16 is a schematic view of a prism positioned for a third wavelength.

The transmissive prism 370 is then rotated to a second position, shown FIG. 13. In this position, prism 370 refracts the incident illumination along refracted light beam path 395 at a second angle to the plane of the second reflective LCD modulator 95. The angle that the incident illumination makes with the second reflective LCD modulator 95 can be equivalent to or different than the angle of incident illumination to reflective LCD modulator 90. If these angles are not equivalent, the resulting phase change between the image of the image of the first reflective LCD modulator 90 and the image of the second reflective LCD modulator 95 must then be accounted for, adding complexity to the system. To ensure similar imaging conditions at the media, the plane of the media may be rotated. The transmissive element can be rotated in a similar manner to multiple positions if multiple reflective LCD modulators are to be imaged. The transmissive element can be rotated in a similar manner to multiple positions if the illuminating beam is polychromatic. Here, the images created using exposures from the multiple wavelengths need to be coincident at the image plane. To ensure the superposition of these images, the transmissive prism can be rotated slightly to account for any dispersion as shown in FIGS. 14, 15 and 16. The transmissive element can also be rotated such that the image position of the second modulator at the media is displaced with respect to the image position of the first modulator. Images from multiple modulators can be displaced with respect to each other in a similar manner. These images may be interwoven or juxtaposed depending on the amount of displacement to form a composite image at the media plane.

embodiments that have been described can be generalized to incorporate multiple reflective LCD modulators by the rotation or translation of the appropriate optical elements to multiple positions. One of the key aspects governing this printing system and applicability to all embodiments is the means used to achieve sufficient uniformity while retaining the gray scale. The reflective LCD modulator 90 alone can receive up to 8 bits of bit depth. However, 8 bits to the modulator may not translate to 8 bits at the media. To print an adequate gray scale, additional bit depth must be provided. Furthermore, reflective LCD modulators are known to have some measure of roll-off or loss of contrast at the edges of the device. To address both these issues, the print system takes advantage of the fact that modulators designed for projection display generally refresh data faster then is required for printing. Consequently, it is possible to create a single color image at the media as a super-position of a series of images of a given color. The individual images that comprise the final image vary both in information content and illumination.

First, every image is broken into the three basic color components. Information corresponding to the red content of the image is displayed on the modulator. Within each color, multiple frames of image data are displayed on the modulator. Once an acceptable frame is displayed on the modulator, the first illumination pulse is employed. Following the recording of the initial frame of data, a subsequent frame is displayed on the modulator. The illumination level of the subsequent frame is altered according to the density requirements at the media. Similarly, as many frames as may be needed are introduced at the modulator and imaged at the media with the illumination adjusted accordingly. It is possible to maintain the same image data at the modulator and by altering the illumination level alone, introduce additional bit depth. By varying the illumination level, (and/or duration), and by altering the information content, the system can build a composite image out of a series of preliminary images. The superposition of the images in a given color of varied information content and varied illumination level introduces additional bit depth to the composite image. Once a given color is printed the same procedure is repeated with the data and illumination corresponding to the next color.

Creating a balanced composite image comprised of several images provides many challenges both in gray scale generation as well in elimination of artifacts. When multiple LCDs are employed each LCD transmission and gray scale profile must be mapped. The image data transmitted to each LCD must reflect the characteristics of that device, for the illumination of the system. For example, reflective LCD modulator 90 in FIGS. 3*a* and 3*b* may have higher transmission characteristics than reflective LCD modulator 95. The corresponding image data must reflect the discrepancy and balance it out. There are several ways to balance such a discrepancy. First, each device can be loaded with its own electro-optic response curve. The top surface of LCD 52 and backplane of LCD 56 voltages can be set independently. The code values can be mapped differently to the two devices. For example, code value 200 for reflective LCD modulator 90 may actually be a shorter pulse duration in a pulse width scheme or a lower drive voltage in analog scheme than code 200 for reflective LCD modulator 95, if reflective LCD modulator 95 does not have an equal transmission characteristic, or the net light level reaching or departing reflective LCD modulator 95 is lower than reflective LCD modulator 90, such correction would be required. Each device will require it's own gray scale calibration. It is possible for devices that are mapping 14–16 bit tables to an 8 bit device, and then the same driver board may be employed, with different mappings of the two devices. In the case of interwoven images, this balancing is the primary adjustment.

The second concern in the imaging system is to correct non-uniformities in the print. The exposure system can correct for some non-uniformities such as roll-off at the modulator edges. One way to accomplish this is to introduce additional image data to the modulator activating only the edge modulator sites. These images are exposed and superimposed on the other images thus giving additional depth to the edge regions. An example method would be to scan a series of images taken at the reflective LCD modulators 90, 95, create data maps, and convolve all input data with initial maps of the reflective LCD modulators 90, 95 to correct the image. Similar techniques can be used to adjust for modulator non-uniformities that are known prior to operation.

Another concern is image quality and the presence of artifacts. In the interweaving method, balancing the device should be adequate. However, each device will need it's own gray scale and individual uniformity map. In the cases of image juxtaposition or stitching of images, image data needs to reflect the gray scale, the device uniformity, and the regions of overlap need to be balanced with the non-overlapped regions of the image.

For embodiments using a single device, all corrections will be a function of image data. Although voltage offsets may be employed, there is only one device voltage offset would be insufficient. Careful balancing of image data used in conjunction with a multiple exposure scheme would correct for artifacts.

For the embodiments utilizing multiple LCDs the gray scale in the region of overlapped or interwoven images needs to be established as a function of both devices. This may require a different electro-optic curve for that region or simply a different mapping of code values. Such an algorithm may require use of multiple exposures to isolate overlap data from non-overlap data. If this is not possible the image data should be adjusted or offset such that the composite image produces the same gray scale as non-overlapped regions.

If dithering is employed gray scale generation, uniformity correction, and artifact reduction should be mapped as a function of the dither. Because of the digital addressability of the reflective LCD modulator and the pulsed LED illumination method of illumination, this approach to printing provides an adequate bit depth and reasonable timing for use in a photographic printer.

The invention has been described in detail with particular reference to certain preferred embodiments thereof, but it will be understood that variations and modifications can be effected within the scope of the invention. For example, embodiments which show use of a mirror to redirect light may also use a prism. Conversely, embodiments which are shown using a prism may also use a mirror. cl Parts List 10. Printing system
12. Light emitting diodes (LEDs)
14. Collimating lens
25. LED array
30. Field lens
40. Polarizer
45. Uniformizing optics
47. Polarizer position
49. Polarizer position
50. Lenslet array
52. Top surface of LCD
54. Liquid crystal material
56. Backplane of LCD
60. Field lens
65. Conjugate planes
70. Condensor lens
75. Illumination optics
80. Polarizing beamsplitter
83. Large polarizing beamsplitter element
85. Polarization compensator
87. Polarization compensator 90. Reflective LCD modulator
91. Data path
92. Modulator site
95. Reflective LCD modulator
100. Center of reflective LCD modulator 90
102. Center of reflective LCD modulator 95
104. Facet of beamsplitter element in proximity to reflective LCD modulator 90
106. Facet of beamsplitter element in proximity to reflective LCD modulator 95
110. Print lens assembly
112. Center of beamsplitter element facet 104
114. Center of beamsplitter element facet 106
120. Linear polarizer
122. Incident light
124. S-polarization state
126. Reflected p-polarization
128. P-polarization state
129. Reflected s-polarization light
130. Image plane
140. Light sensitive media
150. Image of reflective LCD modulator 90
160. Image of reflective LCD modulator 95
170. Region of overlap between image of LCD 150 and image of LCD 160
172. Region of overlap between image of LCD 160 and image of LCD 180
177. Region of overlap between image of LCD 150 and image of LCD 180
180. Intermediate image in image juxtaposition
190. Composite image
195. Composite interlaced image
200. Image of single pixel from reflective LCD modulator 90
210. Image of single pixel from reflective LCD modulator 95
220. Region of overlap between pixel image 200 and pixel image 210
230. Initial LCD position
250. Second modulator position
260. Third modulator position
270. Fourth modulator position dithering for interwoven image
370. Transmissive prism
380. Undeflected light beam path
390. Refracted light beam path
395. Refracted light beam path
400. Reflected light beam path
402. Angle of incident light at reflective LCD modulator 90
403. Angle of incident light at reflective LCD modulator 95
405. Reflected light beam path
410. LCD position for blue wavelength light
412. Refracted light beam path for blue light
420. LCD position for green wavelength light
422. Refracted light beam path for green light
430. LCD position for red wavelength light
432. Refracted light beam path for red light
440. Reflective element
441. Motor
442. Reflective element
444. Reflective element
450. Base plate
460. Base plate position #1
470. Base plate position #2
480. Plane parallel plate
510. Redirected light beam path
520. Redirected light beam path

What is claimed is:

1. An apparatus for printing images comprising:

telecentric illumination optics which provides uniform area light;

a polarizing beamsplitter which receives said uniform area light and redirects a first polarization state of said light;

a first reflective liquid crystal display (LCD) modulator which modulates said first polarized light on a site by site basis with a first image or a second image and reflects said modulated light through said polarizing beamsplitter;

a parallel plate tilted at a first angle or a second angle which spatially displaces said modulated light with said first image along a first line normal to said polarizing beamsplitter, or with said second image, along a second line normal to said beamsplitter;

a print lens assembly which images said modulated light with said first image to a first position on a media plane to print said first image on a light sensitive medium and images modulated with said second image on said media plane print said second image on said light sensitive medium; and a motor which rotates said parallel plate between said first angle and said second angle wherein said second line that is parallel to said first line when said parallel plate is tilted at said second angle to form a composite image on said light sensitive medium.

2. An apparatus as a claim 1 wherein said second image is displaced diagonally from said first image.

3. An apparatus as a claim 1 wherein said second image is displaced laterally from said first image.

4. An apparatus as a claim 1 wherein said telecentric illumination optics provides color sequential light.

5. An apparatus as a claim 1 wherein said telecentric illumination optics provides monochromatic light.

6. An apparatus as a claim 1 wherein a plurality of voltages to said reflective LCD are adjustable.

7. An apparatus as a claim 1 wherein said print lens demagnifies said first image.

8. An apparatus as a claim 1 wherein said print lens magnifies said first image.

9. An apparatus as a claim 1 wherein said polarizing beamsplitter transmits a second polarization state of said telecentric light to a second reflective LCD modulator;

wherein said second reflective LCD modulator modulates said second polarized light on a site by site basis and reflects said modulated light to said polarizing beamsplitter; and wherein said polarizing beamsplitter redirects said second modulated light to said parallel plate.

10. A method for printing high resolution images comprising the steps of:

providing telecentric uniform area light;

polarizing said light;

redirecting a first polarization state of said polarized light to a spatial light modulator;

modulating said first polarized light with first image data;

directing said modulated light along a first line to an imaging plane to a light sensitive material to form a first image;

modulating said first polarized light with second image data; and redirecting said modulated light with said second image data along a second line to said imaging plane to said light sensitive material to form a composite image.

* * * * *